Dec. 30, 1930.  C. R. DAVIS  1,787,035
SHIELD FOR AUTOMOBILE RADIATORS
Filed June 30, 1930
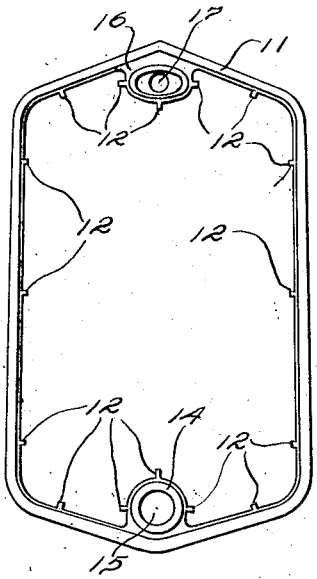
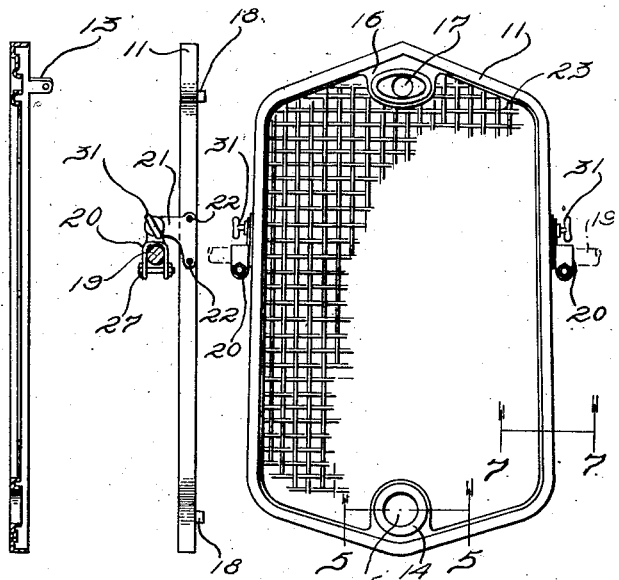
Fig. 1.  Fig. 2.  Fig. 3.  Fig. 4.
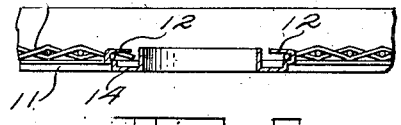
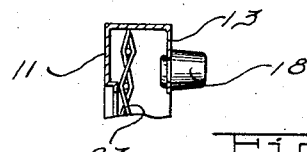
Fig. 5.  Fig. 6.
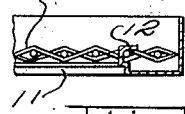
Fig. 7.
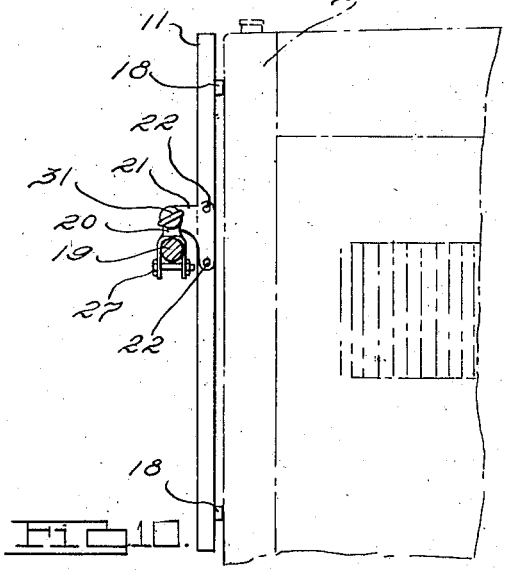
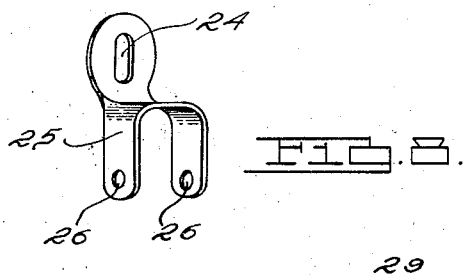
Fig. 8.
Fig. 9.
Fig. 10.
INVENTOR
Clarence R. Davis.
BY
ATTORNEY Patented Dec. 30, 1930

1,787,035

UNITED STATES PATENT OFFICE

CLARENCE R. DAVIS, OF DETROIT, MICHIGAN, ASSIGNOR TO DAVIS TOOL & ENGINEERING COMPANY, OF DETROIT, MICHIGAN, A CORPORATION OF MICHIGAN

SHIELD FOR AUTOMOBILE RADIATORS

Application filed June 30, 1930. Serial No. 464,780.

My invention relates to a shield for automobile radiators and particularly to an ornamental protective shield formed of wire screen held by an outer frame, which is provided with suitable means for attaching the shield in front of an automobile radiator.

Shields of this general type have been constructed previously, but great difficulty has been experienced in holding the shield firmly in front of the automobile radiator with elaborate and expensive holding devices. Also, the method of fastening the wire screen to the outer frame has been such that extra weight has been added to the shield and extra expense has been added to the manufacturing cost.

It is, therefore, an object of the present invention to provide a shield for an automobile radiator, which shield may be held firmly in place by an inexpensive holding device and in which the wire screen is securely fastened to the shield frame without excess weight and extra expense in the manufacture of such a shield.

These, and various objects, features of arrangement, construction and operation, are plainly shown and described and will be best understood by reference to the accompanying drawings, wherein I have shown a preferred embodiment of my invention, in which Fig. 1 is a front plan view of the outer frame portion of the shield showing the projections for holding the wire screen in place;

Fig. 2 is a side elevation in cross section of the frame shown in Fig. 1;

Fig. 3 is a view in side elevation of the finished shield showing it attached to the supporting bar, which is shown in cross section;

Fig. 4 is a front plan view of the finished shield;

Fig. 5 is a fragmentary view in cross section taken on the line 5—5 of Fig. 4;

Fig. 6 is a fragmentary view partially in cross section showing a detail of the mounting of the resilient buffer members shown in Fig. 3;

Fig. 7 is a fragmentary view in cross section taken on the line 7—7 of Fig. 4;

Fig. 8 is a view in perspective of the portion of the holding means which is attached to the automobile;

Fig. 9 is a plan view of the portion of the holding means which is fastened to the frame of the shield;

Fig. 10 is a plan view in side elevation showing the shield attached in front of an automobile radiator, the supporting cross bar being shown in cross section.

Referring more in detail to the drawings, 11 designates the outer frame of the shield which is shown in Fig. 1, which is provided with a plurality of lugs 12 and with backwardly extending projections 13. The frame 11 is formed with a portion 14, having a hole 15 to permit the insertion of a crank when it is necessary to crank the automobile, and is also formed with a portion 16, having a hole 17 to provide for attachment of the name plate showing the make of the car.

As shown in Fig. 3, resilient buffers 18 are placed in the holes in the projections 13, and the projections 13 are then bent at right angles to the position shown in Fig. 2 as in Fig. 6. The shield is held in place in front of the radiator of the automobile by attachment to the front fender support and lamp bracket bar 19, to which is attached a member 20 adapted for connection with a member 21 which is rigidly attached to the frame 11 of the shield by means of rivets or similar holding means 22.

The finished shield shown in Fig. 4 has a center portion of woven wire or similar material 23. This is held in place on the frame 11 of the shield by means of the projections 12 which are bent around the strands of the wire and hold it firmly in place on the frame of the shield. As shown in Figs. 5 and 7, the projections 12 are bent so as to hook around the strands of the wire 23.

Fig. 6 shows a detail of the frame in its final form and shows the resilient block 18 firmly held in the projection 13, which is formed as a part of the frame 11.

The means for holding the shield on the automobile consists of the two parts 20 and 21. As shown in Fig. 8, the part 20 is provided with a vertical slot 24 in the ear portion, which is bent upwardly and at right angles to the U-shaped portion 25. Holes 26 are provided in the U-shaped portion 25 to receive a bolt or similar clamping means 27 for securing the member 20 rigidly to the fender support and lamp bracket cross bar 19.

The member 21 is shown in Fig. 9 and consists of a sheet of metal having a projecting portion in which is provided a longitudinal slot 28 and holes 29 for securing the same to the frame 11 of the shield by means of the rivets or similar means 22 (shown in Fig. 3).

As shown in Fig. 10, the member 20 is secured to the fender support and lamp bracket cross bar 19 by means of the bolt or similar clamping means 27. The member 21 is securely fastened to the frame 11 of the shield and is placed between the fender support and lamp bracket cross bar 19 and the front of the radiator 30 of an automobile. The resilient buffers 18 rest upon the front of the radiator 30, and a wing nut and bolt 31 is placed through the vertical slot 24 of the member 20 and the longitudinal slot 28 of the member 21. By means of these two slots a shield may be adjusted either in a vertical or longitudinal direction and secured at the proper point in order to adapt it for use on various models of the different makes of automobiles.

It will thus be seen that I have provided a shield for an automobile radiator which has an inexpensive holding device, and in which novel fastening means for the wire screen have been provided which reduce the manufacturing expense and also eliminate much excess weight from such a shield.

While I have illustrated and described one embodiment of my invention, it is apparent that various changes may be made as to the form of the shield. These and other modifications may be made without departing from the spirit of my invention and I do not wish to be limited to the precise details of construction as herein set forth, but desire to avail myself of all changes within the scope of the appended claims.

Having thus described my invention, what I claim is new and desire to secure by Letters Patent of the United States, is:—

1. A shield for automobile radiators comprising a frame, holding means secured to said frame and comprising forwardly projecting arms and rearwardly projecting resilient buffers, a screen extending over the central portion of said shield and secured to said frame.

2. A shield for automobile radiators comprising a frame, holding means secured to said frame and comprising forwardly projecting arms and rearwardly projecting resilient buffers, a wire screen extending over the central portion of said shield, and secured to said frame by means integral with said frame.

3. A shield for automobile radiators comprising a frame, holding means secured to said frame and comprising forwardly projecting arms and rearwardly projecting resilient buffers, a wire screen extending over the central portion of said shield, and secured to said frame by metal projections integral with said frame.

4. A shield for automobile radiators comprising a frame, holding means secured to said frame and comprising forwardly projecting arms, a wire screen extending over the central portion of said shield and secured to said frame.

5. A shield for automobile radiators comprising a frame, holding means secured to said frame, a wire screen extending over the central portion of said shield and secured to said frame by means integral with said frame.

6. A shield for automobile radiators comprising a frame, holding means secured to said frame, a wire screen extending over the central portion of said shield and secured to said frame by metal projections integral with said frame.

7. A shield for automobile radiators comprising a frame, a wire screen secured to said frame, and means for holding said shield on an automobile comprising clamping members provided with a vertical slot and adapted for attachment to the automobile, forwardly projecting arms provided with longitudinal slots and attached to said shield and so formed that the longitudinal slots of the forwardly projecting arms register with the vertical slots of the clamping member and means passing through said slots for securing said forwardly projecting arms to said clamping members.

8. A shield for automobile radiators comprising a frame, a wire screen secured to said frame, and means for holding said shield on an automobile comprising clamping members provided with a vertical slot and adapted for attachment to the automobile, forwardly projecting arms provided with longitudinal slots and attached to said shield and so formed that the longitudinal slots of the forwardly projecting arms register with the vertical slots of the clamping member, means passing through said slots for securing said forwardly projecting arms to said clamping members, and rearwardly projecting resilient buffers secured to said frame and adapted to abut against the front of the radiator of said automobile.

9. An attachment for securing a shield in front of an automobile radiator, comprising a member having a slot and adapted for securing to the automobile fender brace and lamp support bar, a second member having a slot and secured to the frame of said shield and projecting forwardly therefrom, and means passing through said slots for securing said members to one another.

In witness whereof, I hereunto subscribe my name this 27th day of June, 1930.

CLARENCE R. DAVIS.